(12) United States Patent
Puente Pestaña et al.

(10) Patent No.: US 11,991,544 B2
(45) Date of Patent: May 21, 2024

(54) TECHNIQUE FOR CORRELATING NETWORK DATA ANALYTICS INFORMATION

(71) Applicant: Telefonaktiebolaget LM Ericsson (publ), Stockholm (SE)

(72) Inventors: Miguel Angel Puente Pestaña, Madrid (ES); Javier Campo Trapero, Madrid (ES); Miguel Angel Muñoz de la Torre Alonso, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 327 days.

(21) Appl. No.: 17/418,340

(22) PCT Filed: Feb. 7, 2019

(86) PCT No.: PCT/EP2019/052985
§ 371 (c)(1),
(2) Date: Jun. 25, 2021

(87) PCT Pub. No.: WO2020/143926
PCT Pub. Date: Jul. 16, 2020

(65) Prior Publication Data
US 2022/0070702 A1   Mar. 3, 2022

(30) Foreign Application Priority Data
Jan. 8, 2019 (EP) .................................... 19382007

(51) Int. Cl.
H04W 24/08   (2009.01)
H04L 43/04   (2022.01)
(Continued)

(52) U.S. Cl.
CPC ............. *H04W 24/08* (2013.01); *H04L 43/04* (2013.01); *H04L 43/065* (2013.01); *H04W 8/186* (2013.01)

(58) Field of Classification Search
None
See application file for complete search history.

(56) References Cited

U.S. PATENT DOCUMENTS

| | | | |
|---|---|---|---|
| 2014/0022910 A1* | 1/2014 | Zhang | H04W 24/08 370/241.1 |
| 2016/0072963 A1* | 3/2016 | Cai | H04L 67/306 370/259 |

(Continued)

OTHER PUBLICATIONS

Orange, "Analysis of the analytic services provided by the solutions and their relevance to each use case", SA WG2 Meeting #S2-129, Oct. 15-19, 2018, pp. 1-3, Dongguan, P. R. China, S2-1810411.

(Continued)

*Primary Examiner* — Ernest G Tacsik
(74) *Attorney, Agent, or Firm* — COATS & BENNETT, PLLC

(57) ABSTRACT

According to one aspect of the present disclosure, an apparatus for correlating network data analytics, NDA, information for a device group comprising multiple terminal devices is provided, wherein each terminal device is associated with a group member identifier and the device group is associated with a group identifier. The apparatus is adapted to receive an NDA request comprising a group identifier and an NDA specification of NDA information to be collected, to send a group member identifier request comprising the group identifier, and to receive, in response to the group member identifier request, one or more group member identifiers associated with the group identifier. The apparatus is further adapted to configure one or more network functions, NFs, associated with the group member identifiers in accordance (Continued)

with the NDA specification, to obtain, from the one or more NFs, NDA information collected for the group member identifiers based on the NDA specification, and to correlate the NDA information collected for the group member identifiers based on their association with the device group.

20 Claims, 8 Drawing Sheets

(51) Int. Cl.
*H04L 43/065* (2022.01)
*H04W 8/18* (2009.01)

(56) References Cited

U.S. PATENT DOCUMENTS

| | | | | |
|---|---|---|---|---|
| 2016/0364012 | A1* | 12/2016 | Govezensky | G06F 3/017 |
| 2018/0262924 | A1* | 9/2018 | Dao | H04W 72/535 |
| 2019/0191330 | A1* | 6/2019 | Dao | H04L 69/22 |
| 2019/0191467 | A1* | 6/2019 | Dao | H04W 8/186 |
| 2019/0261260 | A1* | 8/2019 | Dao | H04W 8/08 |
| 2019/0387401 | A1* | 12/2019 | Liao | H04W 28/0289 |
| 2020/0100137 | A1* | 3/2020 | Panchal | H04W 48/18 |
| 2020/0252813 | A1* | 8/2020 | Li | G06Q 20/382 |
| 2021/0266765 | A1* | 8/2021 | Zhang | H04W 24/10 |

OTHER PUBLICATIONS

Kddi, et al., "Solution Update and Merging: Solution 18" 3GPP TSG SA WG2 Meeting #129BIS, Nov. 26-30, 2018, pp. 1-5, West Palm Beach US, S2-1811694.

3rd Generation Partnership Project, "Technical Specification Group Services and System Aspects; System Architecture for the 5G System; Stage 2 (Release 15)", 3GPP TS 23.501 V15.3.0, Sep. 2018, pp. 1-226.

3rd Generation Partnership Project, "Technical Specification Group Services and System Aspects; System Architecture for the 5G System; Stage 2 (Release 15)", 3GPP TS 23.501 V15.4.0, Dec. 2018, pp. 1-236.

3rd Generation Partnership Project, "Technical Specification Group Services and System Aspects; Procedures for the 5G System; Stage 2 (Release 15)", 3GPP TS 23.502 V15.3.0, Sep. 2018, pp. 1-330.

3rd Generation Partnership Project, "Technical Specification Group Services and System Aspects; Study of Enablers for Network Automation for 5G (Release 16)", 3GPP TR 23.791 V16.0.0, Dec. 2018, pp. 1-121.

3rd Generation Partnership Project, "Technical Specification Group Services and System Aspects; Procedures for the 5G System; Stage 2 (Release 15)", 3GPP TS 23.502 V15.4.0, Dec. 2018, pp. 1-346.

Ericsson, et al., "Support of Generic Public Subscription Identifier", 3GPP TSG-CT WG3 Meeting #93, Nov. 27-Dec. 1, 2017, pp. 1-10, Reno, US, C3-176204.

* cited by examiner

TECHNIQUE FOR CORRELATING NETWORK DATA ANALYTICS INFORMATION

TECHNICAL FIELD

The present disclosure generally relates to network data analytics (NDA). In particular, a technique for correlating NDA information for a device group comprising multiple terminal devices is presented. The technique may be implemented in the form of an apparatus, a method, an NDA system, and a computer program product.

BACKGROUND

NDA has been an important tool for planning and operating legacy wireless communications networks and will also be implemented in wireless communications networks of the $5^{th}$ generation (5G networks). The core network domain of 5G networks introduces an analytics function called network data analytics function (NWDAF) and described in greater detail in sections 4.19 and 5.2.11 of the $3^{rd}$ Generation Partnership Project (3GPP) Technical Specification (TS) 23.502 V15.3.0 (2018-09).

In brief, NWDAF collects and analyses data from different network functions (NFs) that provide network services. Service consumers such as a policy control function (PCF) may subscribe and unsubscribe at NWDAF to be notified on load level information on a network slice instance. The subscription may be based on periodic notifications and notifications when a threshold is exceeded. The PCF (or other service consumer) may then perform policy decisions based on the load level information obtained for a specific network slice instance.

An important data source for NWDAF are so-called user plane functions (UPFs) that handle user data traffic and optionally include deep packet inspection (DPI) capabilities. NDA information including user plane information pertaining to applications run by terminal devices (such as Internet of Things, IoT, devices or mobile user devices), metric information (such as traffic key performance indicators, KPIs, like throughput and latency) and UPF load information may thus be gathered by NWDAF from UPFs. UPFs may also provide digested NDA information including application usage statistics, UPF load patterns and predictions, user QoE, and so on.

It is currently not defined in the 5G specifications how to bind multiple device subscriptions to a single entity for NDA purposes. As an example, a single user may have multiple device subscriptions, one subscription for a user equipment (UE) device (e.g., a smartphone) and one or more further subscriptions for IoT devices (e.g., wearables, a car, a home entertainment system, etc.). It will often be required to obtain NDA information for all devices across multiple subscriptions of that user. As another example, NDA information pertaining to the devices and subscriptions owned by members of a certain group (e.g., a family or a company) may be of interest. At present, the 5G specifications do not provide a solution to obtaining NDA information across multiple devices that may be associated with multiple subscriptions.

SUMMARY

There is a need for a technique for efficiently correlating NDA information for a device group comprising multiple terminal devices.

According to one aspect, an apparatus for correlating NDA information for a device group comprising multiple terminal devices is provided, wherein each terminal device is associated with a group member identifier and the device group is associated with a group identifier. The apparatus is adapted to receive an NDA request comprising a group identifier and an NDA specification of NDA information to be collected, to send a group member identifier request comprising the group identifier, and to receive, in response to the group member identifier request, one or more group member identifiers associated with the group identifier. The apparatus is further adapted to configure one or more NF associated with the group member identifiers in accordance with the NDA specification, to obtain, from the one or more NFs, NDA information collected for the group member identifiers based on the NDA specification, and to correlate the NDA information collected for the group member identifiers based on their association with the device group.

The terminal devices in the device group may include one or more IoT devices. The terminal devices in the device group may comprise one or more mobile communication devices such as smartphones or tablet computers.

The apparatus may be adapted to receive, from a particular NF, a session notification comprising a group member identifier associated with a session handled by the particular NF. In some variants, the apparatus may further be adapted to determine that the group member identifier comprised in the session notification is one of the one or more group member identifiers received in response to the group member identifier request, wherein the particular NF is then configured in response to the determination. Still further, the apparatus may be adapted to send a session notification request to one or more NFs to trigger the one or more NFs to send session notifications to the apparatus. The session notification request may include at least one of the one or more group member identifiers received in response to the group member identifier request.

Configuring a particular NF by the apparatus may comprise sending the NDA specification to the particular NF. The NDA specification may be sent together with at least one of the one or more group member identifiers received in response to the group member identifier request.

At least one of the one or more NFs may be a user plane entity. In such a case the NDA information may pertain to user data traffic associated with a particular group member identifier.

The apparatus may be adapted to correlate the NDA information by aggregating the NDA information collected for multiple group member identifiers associated with the same group identifier. The aggregation may include one or more of a logical concatenation, a mathematical summation and a mathematical averaging.

The apparatus may be adapted to return the correlated NDA information as a response to the NDA request. The correlated NDA information may be returned towards a source of the NDA request. That source may be an over-the-top (OTT) device. One or more intermediaries or proxies (e.g., a network exposure function, NEF) may be arranged between the correlating apparatus and the OTT device.

The group identifier may be one of a subscription identifier and a user identifier binding the multiple terminal devices into the device group. In another variant, each group member identifier is associated with only a single device group and the group identifier is a group member identifier of one of the terminal devices.

The apparatus may be adapted to receive the NDA request from an NEF interfacing between the apparatus and an application function (AF) external to a network domain in which the apparatus is located. The NEF may have obtained the NDA specification and the group identifier from the AF.

The apparatus may be adapted to at least one of send the group member identifier request to and receive the group member identifiers from one of
- a binding support function (BSF) storing or having access to one or more of user identity information, group member identifiers, data network name and data network information;
- a unified data management (UDM) entity supporting one or more of subscription management, user identification handling and registration management of NFs that serve terminal devices; and
- a unified data repository (UDR) storing subscription data.

The apparatus may be adapted to receive a change notification that the device group associated with the group identifier has changed in that a further terminal device having an associated further group member identifier was added to the device group and/or in that one of the terminal devices was removed from the device group. The apparatus may be adapted to configure an NF associated with the further group member identifier in accordance with the NDA information specification and/or notify the NF associated with group member identifier of the removed terminal device of the removal. Additionally, or in the alternative, the apparatus may be adapted to send a change notification request to trigger sending of change notification requests to the apparatus. The change notification request may comprise the group identifier of the device group for which change notifications are to be received.

In some variants, the apparatus is configured as an NWDAF or any other NF. The NWDAF may be compliant with 3GPP TS 23.502 V15.3.0 (2018-09) or later versions thereof. In a similar manner, one or more of the BSF, UDM, UDR, AFs, NFs, and NEFs may be compliant with 3GPP TS 23.502 V15.3.0 (2018-09) or later versions thereof.

The apparatus may be adapted to utilize a hypertext transfer protocol (HTTP) for at least one of the sending and receiving operations. Moreover, the NDA information may derived by DPI. The NDA information may derived by DPI at one or more UPFs.

The group member identifiers may take the form of subscription identifiers or device identifiers or user identifiers or combinations thereof. At least a first one of the terminal devices may be associated with a user identifier as its group member identifier. At least a second one of the terminal devices may be associated with an IoT identifier as its group member identifier.

According to a further aspect, an apparatus adapted to facilitate correlation of NDA information is presented, wherein the apparatus is adapted to maintain information pertaining to a device group comprising multiple terminal devices, wherein each terminal device has a group member identifier and the device group is associated with a group identifier, to receive an identifier request for the group member identifiers of the terminal devices in the device group for which the NDA information is to be collected, the identifier request comprising the group identifier, and to return, in response to the identifier request, one or more (or all) of the group member identifiers associated with the group identifier.

The apparatus according to the second aspect may be configured as one of
- a BSF storing or having access to one or more of user identity information, group member identifiers, data network name and data network information; and
- a UDM entity supporting one or more of subscription management, user identification handling and registration management of NFs that serve terminal devices; and
- a UDR storing subscription data.

The apparatus according to the second aspect may be adapted to receive the identifier request from an NWDAF. This NWDAF may be configured according to the first aspect.

Also provided is an NDA system comprising the apparatus for correlating NDA information as presented herein and the apparatus for facilitating correlation of NDA information as presented herein.

A further aspect is directed to a method for correlating NDA information for a device group comprising multiple terminal devices, wherein each terminal device is associated with a group member identifier and the device group is associated with a group identifier, the method comprising receiving an NDA request comprising a group identifier and an NDA specification of NDA information to be collected, sending a group member identifier request comprising the group identifier, and receiving, in response to the group member identifier request, one or more group member identifiers associated with the group identifier. The method further comprises configuring one or more network functions, NFs, associated with the group member identifiers in accordance with the NDA specification, obtaining, from the one or more NFs, NDA information collected for the group member identifiers based on the NDA specification, and correlating the NDA information collected for the group member identifiers based on their association with the device group.

A still further aspect is directed to a method for facilitating correlation of network data analytics, NDA, information. The method comprises maintaining information pertaining to a device group comprising multiple terminal devices, wherein each terminal device has a group member identifier and the device group is associated with a group identifier, and receiving an identifier request for the group member identifiers of the terminal devices in the device group for which the NDA information is to be collected, the identifier request comprising the group identifier. The method further comprises returning, in response to the identifier request, one or more (or all) of the group member identifiers associated with the group identifier.

The method may comprise further steps as described above and below. Moreover, the method may be executed by the device presented herein.

Also provided is a computer program product comprising program code portions configured to execute the method presented herein when the computer program product is executed by one or more processors. The computer program product may be stored on a computer readable recording medium or may be provided for download via a network connection.

BRIEF DESCRIPTION OF THE DRAWINGS

Further aspects, details and advantages of the present disclosure will become apparent from the detailed description of exemplary embodiments below and from the drawings, wherein.

DETAILED DESCRIPTION

Figure 1:
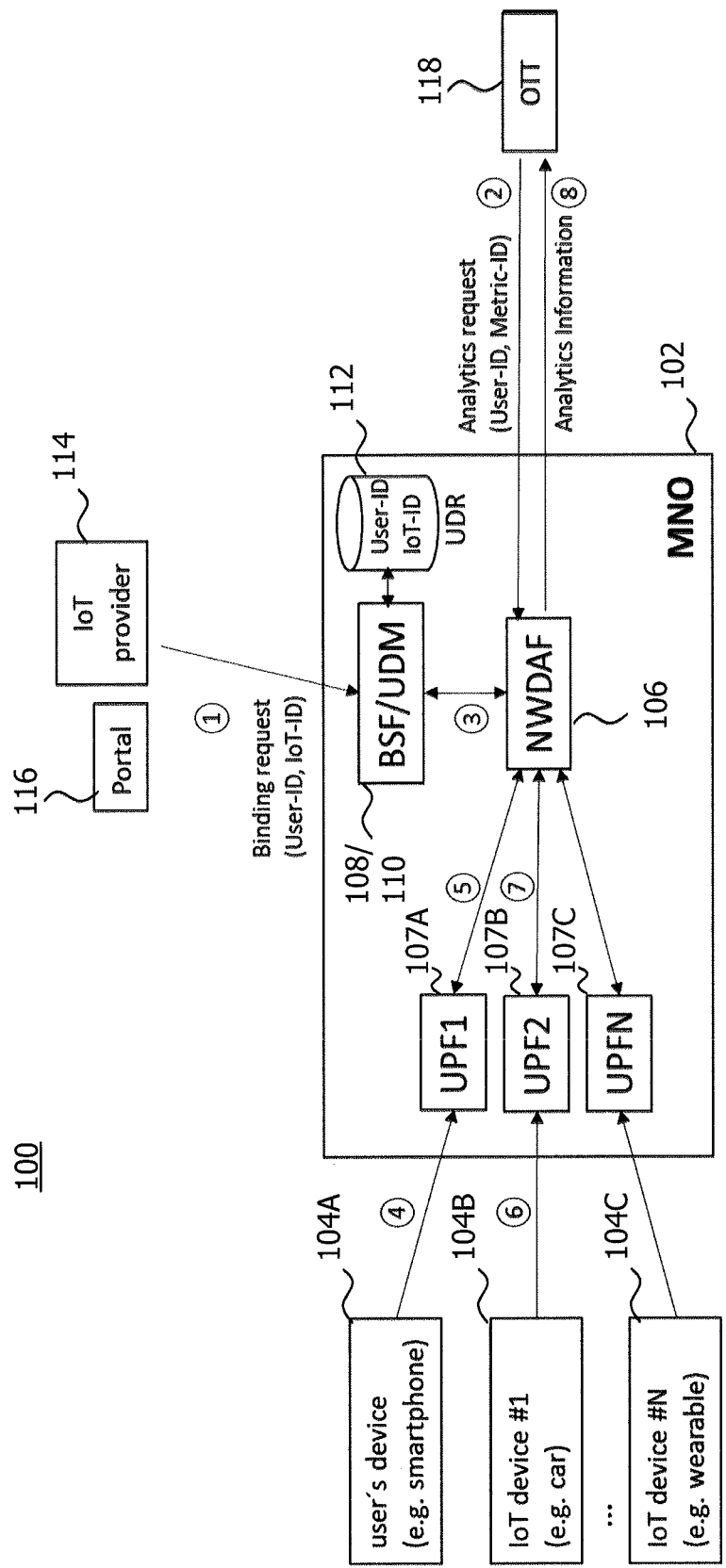
FIG. 1 is a diagram illustrating a network system embodiment of the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, the following description focuses on an exemplary core network configuration in accordance with the 5G specifications, the present disclosure is not limited in this regard. For example, the present disclosure could also be implemented in other cellular or non-cellular wireless communication networks. While, therefore, the embodiments will specifically be described with reference to 5G network entities, it will be appreciated that the present disclosure could also be implemented in other network types and by other network entities having similar functionalities. Moreover, while correlation will be explained in the context of exemplary types of NDA information, it will be readily apparent that other types of NDA information may be correlated as well.

Those skilled in the art will further appreciate that the steps, services and functions explained herein may be implemented using individual hardware circuits, using software functioning in conjunction with a programmed microprocessor or general purpose computer, using one or more Application Specific Integrated Circuits (ASICs) and/or using one or more Digital Signal Processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by one or more processors.

In the following description of exemplary embodiments, the same reference numerals denote the same or similar components.

FIG. 1 illustrates an embodiment of a network system 100 in which the present disclosure can be implemented. As shown in FIG. 1, the network system 100 comprises a core network domain 102 operated by a mobile network operator (MNO). Different terminal devices, such as a UE-type terminal device 104A and two IoT-type terminal devices 104B, 104C, are serviced by the core network domain 102 via an access network domain (not shown). It will in the following be assumed that the core network domain 102 is compliant with 5G specifications, including 3GPP TS 23.502 V15.3.0 (2018-09). The access network domain may also be compliant with the 5G specifications and, optionally, additionally provide compatibility for 4G and 3G terminal devices.

The core network domain 102 generally comprises multiple network entities. In FIG. 1, primarily the network entities participating in NDA mechanisms are illustrated. Those network entities comprise an NWDAF 106 that is configured to collect and analyse data from different UPFs 107A, 107B, 107B. Other network entities may subscribe and unsubscribe at NWDAF 106 to be notified about NDA information. The subscription may be based on periodic notifications and notifications when a threshold is exceeded.

Each UPF 107A, 107B, 107C is associated with one of the terminal devices 104A, 104B, 104C, respectively, and handles the associated user data traffic. It will be appreciated that each of the UPFs 107A, 107B, 107C can in principle handle user data traffic for multiple ones of the terminal devices 104A, 104B, 104C, depending on the network configuration.

The UPFs 107A, 107B, 107C are equipped with DPI technology to inspect and analyse user data traffic of the terminal devices 104A, 104B, 104C. In more detail, the UPFs 107A, 107B, 107C are configured to inspect and analyse the contents of Internet Protocol (IP) data packets beyond their IP 5 tuples. The IP 5 tuples consist of the heading elements of an IP data packet, namely IP source address, IP destination address, source transport address, destination transport address, and protocol over IP (e.g., TCP, UDP). In other words, DPI targets at application layer information conveyed by IP data packets. Based on DPI, service classification information can be obtained, which permits a classification of IP packets, for example according to a configured tree of rules and/or assigning IP packets to a certain service session.

A central component of the core network domain 102 is a so-called unified data management (UDM) 108. UDM 108 supports different registration, subscription and user-related functionalities. In the context of the present disclosure, the following functionalities are of particular interest:

Subscription management.

User identification handling (e.g., storage and management of the subscriber permanent identifier, SUPI, for each subscriber in the 5G system.

Serving NF registration management for terminal devices, such as storing serving access and mobility management function (AMF) for terminal devices, storing serving session management function (SMF) for terminal devices' protocol data unit, PDU, sessions, and so on. SMF is responsible for session establishment, modification and release, including selection and control of the UPF entities. SMF can provide to UPF classification information obtained for the service classification of the user IP data packets.

UDM 108 is associated with a binding support function (BSF) 110 and a unified data repository (UDR) 112. BSF 110 may be deployed standalone or may be co-located with other network functions, such as UDM 108, UDR 112, PCF, network repository function (NRF) and SMF. A specific co-location allows a combined implementation of the BSF 110 with another network entity (such as UDM 108, see FIG. 1).

UDR 112 enables storage and retrieval of subscription data by UDM 108 and corresponds to the home subscriber server (HSS) in pre-5G core network architectures. In the example depicted in FIG. 1, UDR 112 stores the user identifier associated with UE-type terminal device 104A as well as the IoT identifiers associated with the IoT devices 104B and 104C. UDR 112 further enables storage and retrieval of policy data by PCFs, of structured data for exposure, of application data (including packet flow descriptions, PFDs, for application detection and application request information for multiple terminal devices), by a NEF.

BSF 110 stores information about user identity, data network name (DNN), terminal device (IP or Ethernet) address, date network information (e.g., single network slice selection assistance information, S-NSSAI) and PCF address of PCF selected for a certain PDU Session. This information may be stored in the UDR 112 as structured data or internally in the BSF 110. PCF may register, update and remove binding information from the BSF 110 using the Nbsf management service operations (see 3GPP TS 23.502 V15.3.0 (2018-09)). PCF ensures that it is updated each time an IP address is allocated or de-allocated to the PDU session or, for Ethernet PDU sessions supporting binding of Application Function (AF) request based on medium access control (MAC) address, each time it has been detected that a MAC address is used or no more used by a terminal device in the PDU session. For retrieval of binding information, any NF, such as NEF or AF, that needs to discover the selected PCF for the tuple (UE address, DNN, S-NSSAI, SUPI, generic public subscription identifier or GPSI), or for a subset of this Tuple, uses the Nbsf management service discovery service operation defined in 3GPP TS 23.502 V15.3.0 (2018-09). For any AF using Rx, the BSF 110 determines the selected PCF address according to the information carried by incoming Rx requests. The BSF 110 is able to proxy or redirect Rx requests targeting an IP address of a terminal device to the selected PCF. Exemplary BSF services and service operations are defined in 3GPP TS 23.502 V15.3.0 (2018-09).

Still referring to FIG. 1, the network system 100 further comprises an IoT provider entity 114 and a portal 116 (e.g., a Web portal) that permit provisioning UDM 108 and/or BSF 110 with information that defines a binding between a group member identifier such as a user identifier or user group identifier (as an example, a user identifier may be defined in the form of a SUPI of terminal device 104A, such as a smartphone SUPI) and associated group member identifiers in the form of IoT device identifiers. Such information may be provided via the IoT provider entity 114 (e.g., via a dedicated IoT provider portal operated by an IoT device manufacturer) or via the portal 116 (e.g., by the user who typically is aware of his/her subscriptions and terminal devices).

The information received via the IoT provider entity 114, the portal 116, or otherwise permits to group the terminal devices 104A, 104B and 104C into a dedicated device group. The resulting device group is associated with a group identifier. The group identifier is in one variant a dedicated identifier different from the group member identifiers of the terminal devices 104A, 104B and 104C (it may, for example, be assigned by the BSF 110 and/or UDM 108). In another variant, one or more or all of the group member identifiers of the terminal devices 104A, 104B and 104C may be (re-)used as group identifier(s) (provided that the group member identifier(s) has (have) sufficient uniqueness for the NDA information correlation purposes discussed herein).

Assuming, for example, that the three terminal devices 104A, 104B and 104C are associated with the group member identifiers SUPI #1, SUPI #2 and SUPI #3, respectively, then the associated device group with, for example, group identifier #1 may be represented by the following data structure: (group #1; SUPI #1, SUPI #2, SUPI #3). Assuming that the SUPIs are substantially unique, the group identifier can be omitted as each individual SUPI can be used for this purpose. As a result, the device group could be represented by the following data structure: (SUPI #1, SUPI #2, SUPI #3). Many such data structures for different device groups may be stored in UDR 112 (or somewhere else) for being accessible by at least one of NWDAF 106, UDM 108 and BSF 110

Moreover, the network system 100 also comprises an entity 118 in need of correlated NDA information. The entity 118 may be an over-the-top (OTT) entity or any other entity, such as an operator requiring the correlated NDA information for assessing service level agreement (SLA) or quality of experience (QoE) guarantees.

In general, the entity 118 will not be aware of the membership of a particular terminal device 104A, 104B or 104C in a particular device group. As such, the entity 118 will generally be agnostic for which terminal devices 104A, 104B, 104C the NDA information is to be correlated so as to obtain correlated NDA information associated with a particular user or user group.

It will in the following be assumed that the correlation of NDA information is performed by NWDAF 106 of FIG. 1 and that the information binding the terminal devices 104A, 104B and 104C into a device group is maintained by UDM 108 and/or BSF 110 with access to UDR 112. In other words, UDM 108 and/or BSF 110 are configured to facilitate correlation of the NDA information by NWDAF 106.

Figure 2B:
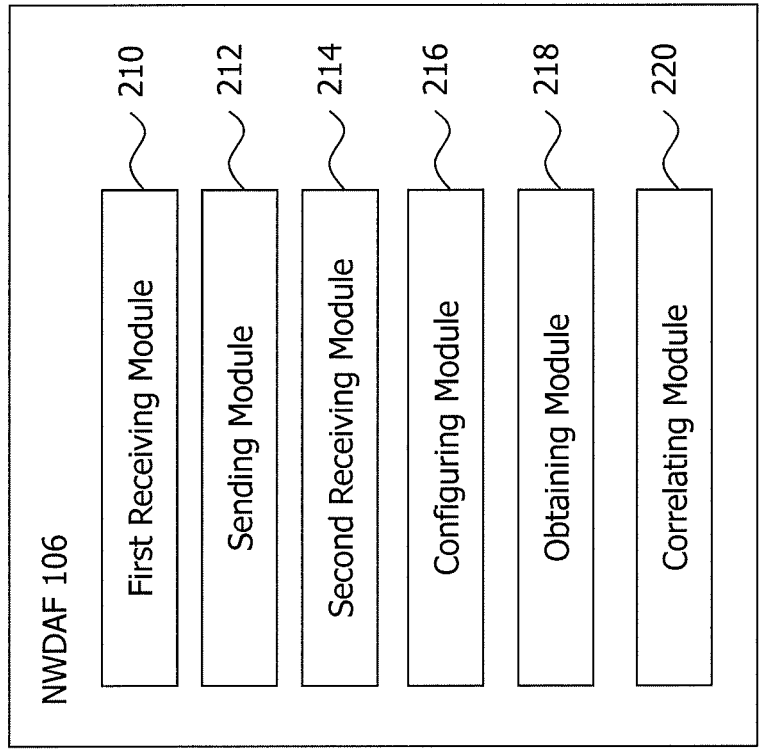
FIGS. 2A, 2B are block diagrams illustrating two correlating apparatus embodiments of the present disclosure.
Figure 2A:
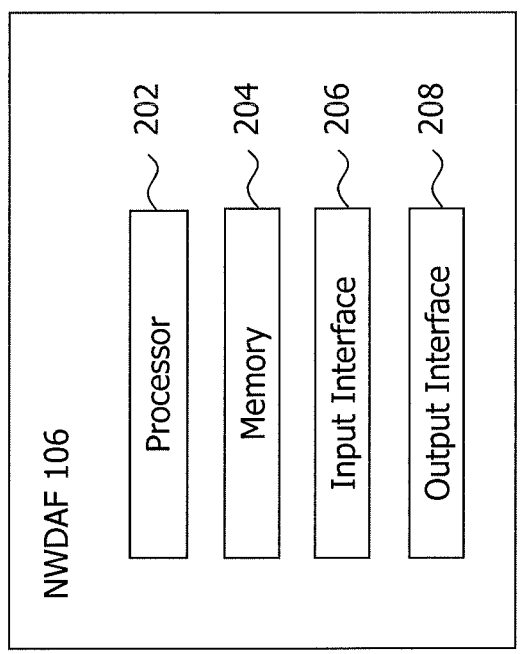

FIGS. 2A and 2B illustrate two embodiments of NWDAF 106 of FIG. 1. In the embodiment illustrated in FIG. 2A, NWDAF 106 comprises a processor 202 and a memory 204 coupled to the processor 202. NWDAF 106 further comprises an optional input interface 206 and an optional output interface 208. The memory 204 stores program code that controls operation of the processor 202.

The processor 202 is adapted to receive, via the input interface 206, an NDA request comprising a group identifier and an NDA specification of NDA information to be collected. The NDA request is received from OTT entity 118 and via one or more proxies. The NDA request pertains to the group of terminal devices 104A, 104B, 104C illustrated in FIG. 1 and includes an associated group identifier (which could, as explained above, take the form of a group member identifier or a dedicated group identifier). The NDA request may comprise two or more individual messages to separately signal the group identifier in a first message and the NDA specification in a second message. Alternatively, the group identifier and the NDA specification may be signalled in a single message The processor 202 is also adapted to send, via the output interface 208, a group member identifier request comprising the group identifier towards UDM 108 and/or BSF 110 and to receive, in response to the group member identifier request and from UDM 108 and/or BSF 110, the group member identifiers associated with the group identifier. In the example illustrated in FIG. 1, the group member identifiers associated with terminal devices 104A, 104B, 104C will thus be obtained. In case a group member identifier is used as group identifier, the corresponding group member identifier signalled by NWDAF 106 towards UDM 108 and/or BSF 110 need not be returned as this group member identifier is already known to NWDAF 106.

The processor 202 is further adapted to configure one or more NFs associated with the group member identifiers in accordance with the NDA specification received in the NDA request. In the context of the network system embodiment illustrated in FIG. 1, the processor 202 configures the NFs represented by UPFs 107A, 107B and 107C. The processor 202 is also adapted to obtain, from UPFs 107A, 107B and 107C as exemplary NFs, NDA information collected for the group member identifiers with terminal devices 104A, 104B, 104C based on the NDA specification and to correlate the NDA information collected for the group member identifiers based on their association with the device group. Depending on the type of NDA information specified in the NDA specification, such a correlation may, for example, comprise aggregating (e.g., mathematically adding or logically concatenating) the NDA information obtained from UPFs 107A, 107B and 107C across terminal devices 104A, 104B, 104C.

FIG. 2B shows an embodiment in which the NWDAF 106 is implemented in a modular configuration. As shown in FIG. 2B, the NWDAF 106 comprises a first receiving module 210 to receive the NDA request, a sending module 212 to send the group member identifier request, second receiving module 214 to receive the group member identifiers, a configuring module 216 to configure the NFs, an obtaining module 218 to obtain the NDA information, and a correlating module 220 to correlate the obtained NDA information.

Figure 3B:
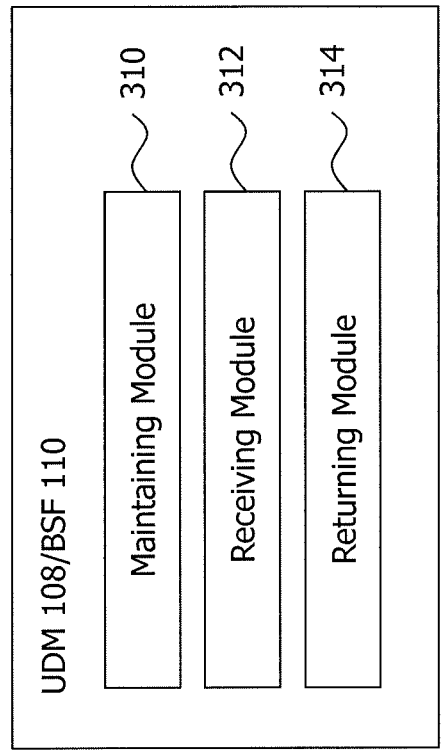
FIGS. 3A, 3B are block diagrams illustrating embodiments of two apparatuses for facilitating correlation in accordance with the present disclosure.
Figure 3A:
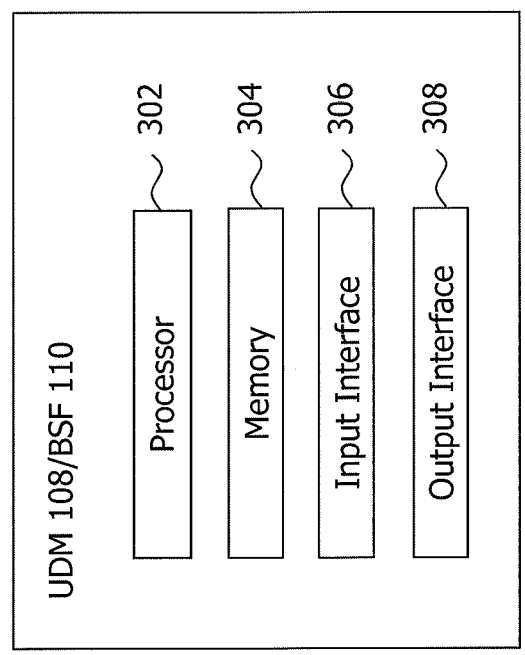

FIGS. 3A and 3B illustrate two embodiments of UDM 108 and/or BSF 110 of FIG. 1. In the embodiment illustrated in FIG. 3A, UDM 108 and/or BSF 110 comprise(s) a processor 302 and a memory 304 coupled to the processor 302. UDM 108 and/or BSF 110 further comprise(s) an optional input interface 306 and an optional output interface 308. The memory 304 stores program code that controls operation of the processor 302.

The processor 302, in combination with the memory 304, is adapted to maintain information pertaining to the device group comprising terminal devices 104A, 104B, 104C and many further device groups. As explained above, each terminal device 104A, 104B, 104C has a group member identifier and the device group is associated with a group identifier.

The processor 302 is further adapted to receive, via the input interface 306 and from NWDAF 106, an identifier request for the group member identifiers of terminal devices 104A, 104B, 104C in the device group for which the NDA information is to be collected. The identifier request comprises the group identifier which, as explained above, may take the form of the group member identifier of any of terminal devices 104A, 104B, 104C.

The processor 304 is also adapted to return to the NWDAF 106, via the output interface 308 and in response to the identifier request, the group member identifiers associated with the group identifier. In the present case, all the (three) group member identifiers associated with the device group consisting of terminal devices 104A, 104B, 104C will be returned. It will be appreciated that if a specific group member identifier has been signalled in the identifier request as the group identifier, this group member identifier need not necessarily be returned to the NWDAF 106.

FIG. 3B shows an embodiment in which the UDM 108 and/or BSF 110 are/is implemented in a modular configuration. As shown in FIG. 3B, the UDM 108 and/or BSF 110 comprises maintaining module 310 to maintain the device group information for multiple device groups, a receiving module 312 to receive a dedicated group identifier and a returning module 314 to return the group member identifiers associated with this group identifier.

Figure 4:
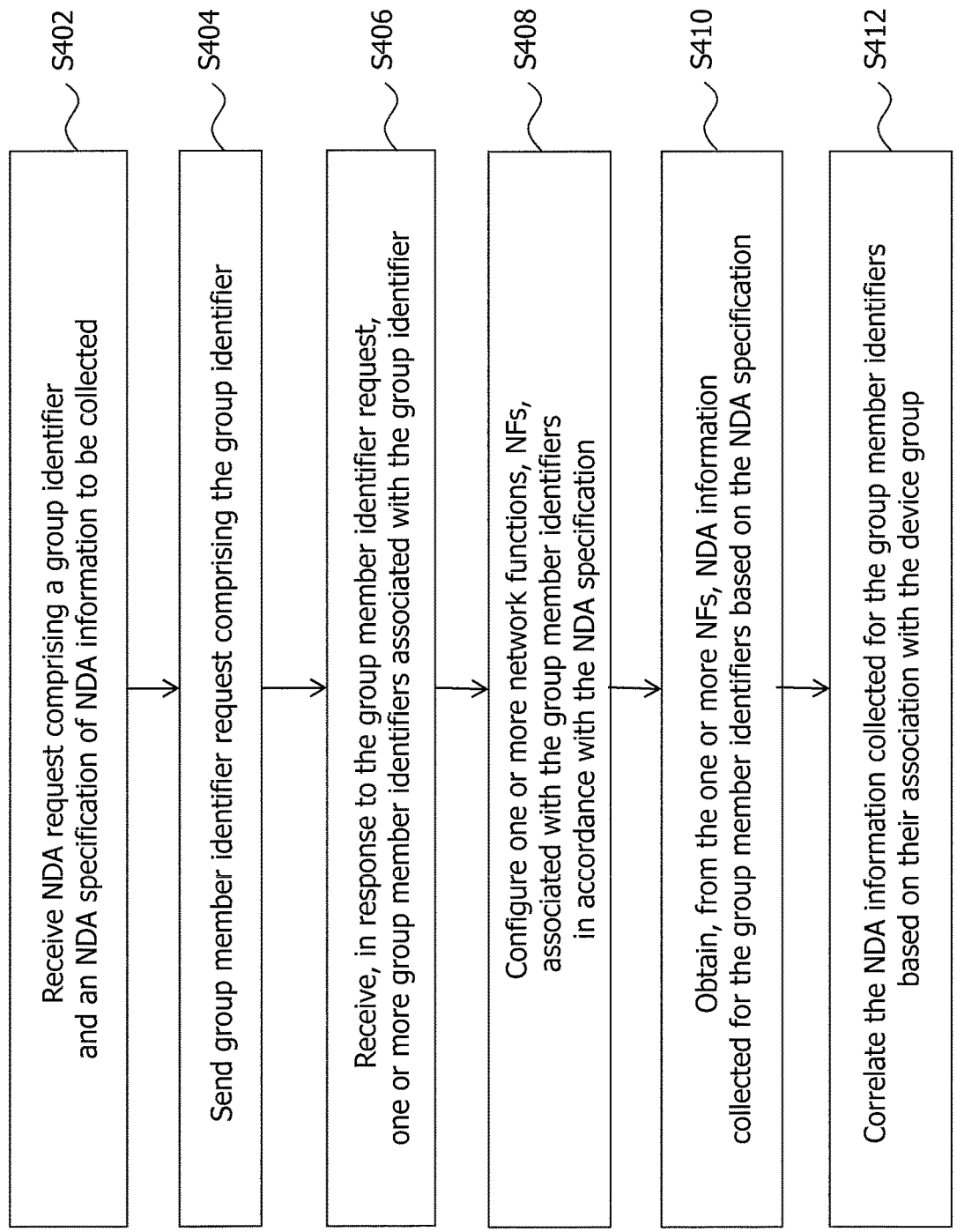
FIGS. 4, 5 are flow diagrams illustrating method embodiments of the present disclosure.
Figure 5:
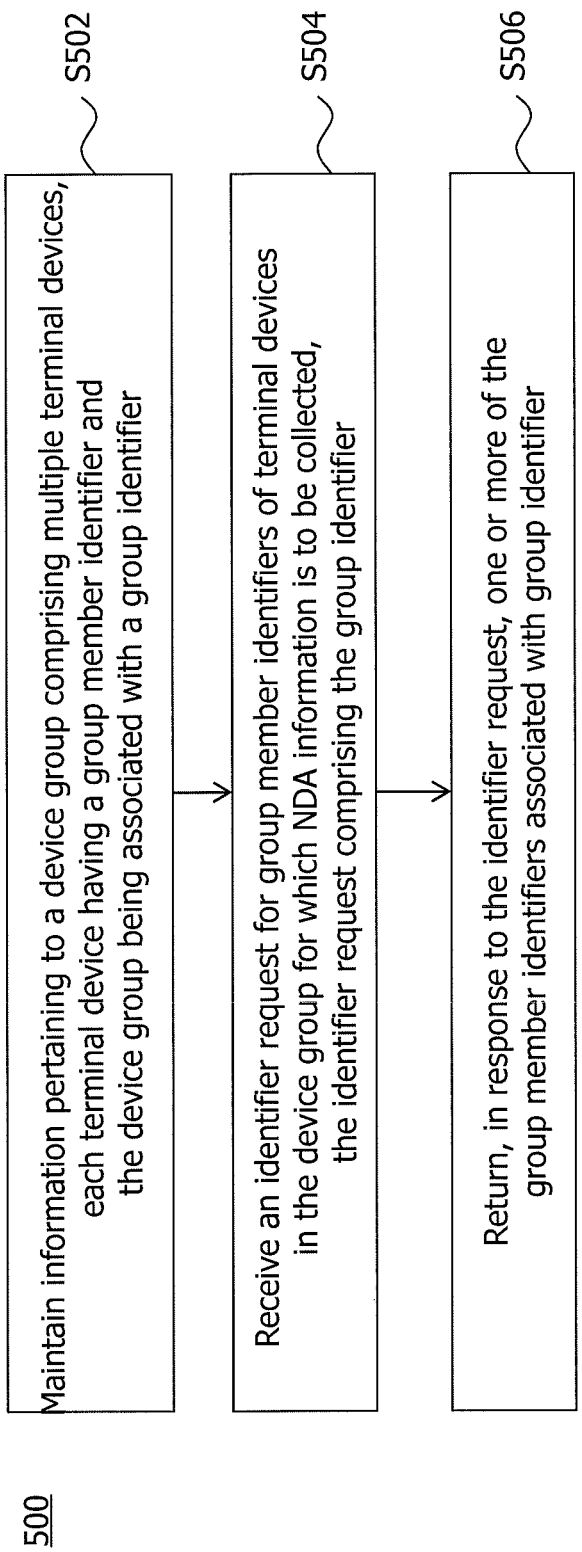

FIGS. 4 and 5 illustrate in two flow diagrams 400, 500 method embodiments of correlating NDA information and facilitating this correlation, respectively, for the network system embodiment 100 illustrated in FIG. 1, or in any other network system. The method embodiment of FIG. 4 may be performed by any of the NWDAF embodiments of FIGS. 2A and 2B. The method embodiment of FIG. 5 may be performed by any of the UDM/BSF embodiments of FIGS. 3A and 3B.

FIGS. 4 and 5 illustrate the steps after UDM 108 and/or BSF 110 have/has been provisioned with the grouping, or binding, between group member identifiers such as user identifiers or user group identifiers (e.g., User-ID=smartphone SUPI for terminal device 104A in FIG. 1) and IoT device identifiers (e.g., IoT-ID=Car SUPI for terminal device 104B in FIG. 1), and have/has assigned a group identifier thereto. Such a binding may be performed directly by a user through a Web portal 116 provided by the MNO or by an IoT provider (e.g., by the car manufacturer at the time the car is bought by the user) through portal 114. This is illustrated by step (1) in FIG. 1 and not shown in FIGS. 4 and 5. The binding could alternatively by communicated to UDM 108 and/or BSF 110 by NWDAF 106 (e.g., by running an analytics function based on close locations inferred for bound devices/subscriptions, or in any other manner).

Bindings between grouped group member identifiers (e.g., User-ID/User-group-ID and IoT-IDs in the scenario in FIG. 1) will be stored and maintained by UDM 108 and/or BSF 110 as data structures in UDR 112 for a large number of device groups, as illustrated by step S502 in FIG. 5

In step (2) illustrated in FIG. 1, OTT entity 118 (e.g., a portal provided by NMO and operated by a company interested in analytics data for a certain user and its bound devices) requests the MNO (through NWDAF 106) for correlated NDA information defined by an NDA specification (e.g., a predefined metric-ID defining a metric defining the NDA information to be collected) about a certain user or user group (indicated, e.g., by User-ID/User-group-ID) and its bound devices. The OTT will as a rule not aware of the binding of a group of terminal devices by their associated group member identifiers (User-IDs/User-group-IDs and IoT-IDs in the scenario of FIG. 1). As such, the NWDAF 106 will receive in step S402 of FIG. 4 a corresponding NDA request that has been triggered via the OTT entity 118. It will be appreciated that the NDA request may be received from the OTT entity directly or via one or more proxies, such as an NEF (not shown in FIG. 1).

In step (3) of FIG. 1, NWDAF 106 requests from UDM 108 and/or BSF 110 device/subscription binding information for the group identifier (e.g., a User-ID associated with terminal device 104A in the scenario of FIG. 1) indicated by the OTT via the OTT entity 118. To this end, NWDAF 106 sends a corresponding group member identifier request comprising the group identifier to UDM 108 and/or BSF 110 in step S402 of FIG. 4, where it is received as illustrated by step S504 of FIG. 5.

UDM 108 and/or BSF 110 (after querying UDR 112 based on the group identifier, such as the User-ID in the scenario of FIG. 1) return(s) to NWDAF 106 the group member identifiers associated with the group identifier, see step S506 in FIG. 5. In the scenario of FIG. 1, the group member identifiers "IoT-ID" of terminal devices 104B and 104C will thus be returned. As an option, the group member identifier "User-ID" associated with terminal device 104A, that served as group identifier in this example, may be returned as well. However, this is not required if NWDAF 106 is aware of the fact that the "group" identifier "User-ID" also serves as group member identifier. The corresponding group member identifier information is received by NWDAF 106 in step S406 of FIG. 4.

In step (4) of FIG. 1, terminal device 104A with group member identifier "User-ID" registers in the core network domain 102 at UPF 107A and triggers a PDU session for "User-ID" to start application traffic (e.g., for a social network application). In step (5) of FIG. 1, NWDAF 106 gets notified by UPF 107A via a session notification about PDU session establishment (or modification) for the terminal device 104A having the group member identifier "User-ID". In response to this notification, NWDAF 106 configures UPF 107A in accordance with the NDA specification (e.g., according to a metric-ID) defined via OTT entity in step (1), see step S408 in FIG. 4. The target UPF 107A then collects and provide the requested NDA information to NWDAF 106 in step S410 of FIG. 4. It will be appreciated that depending on the prevailing use case, also NFs different from UPFs could be configured to provide the required NDA information.

In step (6) of FIG. 1, terminal device 104B (e.g., car) registers in the core network domain 102 and triggers PDU session for its associated group member identifier ("IoT-ID") to start data traffic (e.g., to send car statistics). In step (7) of FIG. 1, NWDAF 106 also gets notified via a session notification about the PDU session establishment (or modification) associated with "IoT-ID". NWDAF then configures the associated UPF 107B accordingly, as explained above with reference to step S408 (which will be performed a second time, but now in regard to the second UPF 107B). UPF 107B will then start collecting the requested NDA information for terminal device 104B and provide the collected NDA information to NWDAF 106, as explained above with reference to step S410.

As illustrated by step (8) of FIG. 1 and step S410 in FIG. 4, NWDAF 106 then correlates the NDA information received from UPF 107A and UPF 107B. As an example, the NWDAF 106 may perform the correlation by aggregating or averaging the NDA information received for a specific period of time from UPF 107A and the NDA information received for the same period of time from UPF 107B. The aggregation may be a mathematical summation, a string-type operation (e.g., a concatenation of the NDA information received from different UPFs), or any other operation. As further illustrated in FIG. 1, the NWDAF returns the correlated NDA information to OTT entity 118.

In the following, further exemplary use cases will be described with reference to three signaling diagrams illustrated in FIGS. 6A to 6C. The signaling diagrams of FIGS. 6A to 6C relate to a BSF-based solution. A UDM-based solution will be basically identical, just by replacing BSF 110 with UDM 108. It will be assumed that the signaling is partially based on HTTP as well as 3GPP TS 23.502 V15.3.0 (2018-09) and later versions thereof.

In one use case, a car insurance company associated with an AF 124 is interested in correlated NDA information related to user habits (e.g., if a certain user is actively using WhatsApp while driving the car so as to calculate an—increased—insurance quota for next year). Another use case would be to bind the different devices/subscriptions of the family members and run analytics to infer customer profiles for families while at home.

For the use case of interest, the following assumptions are made. A user owns two different subscriptions with the same MNO, namely a mobile subscription (e.g., used with a smartphone as illustrated by reference numeral 104A in FIG. 1) and a connected car subscription (e.g., associated with a car as illustrated by reference numeral 104B in FIG. 1). BSF 110 is capable of provisioning information on bound devices/subscriptions as stored, for example, in UDR 112.

Figure 6A:
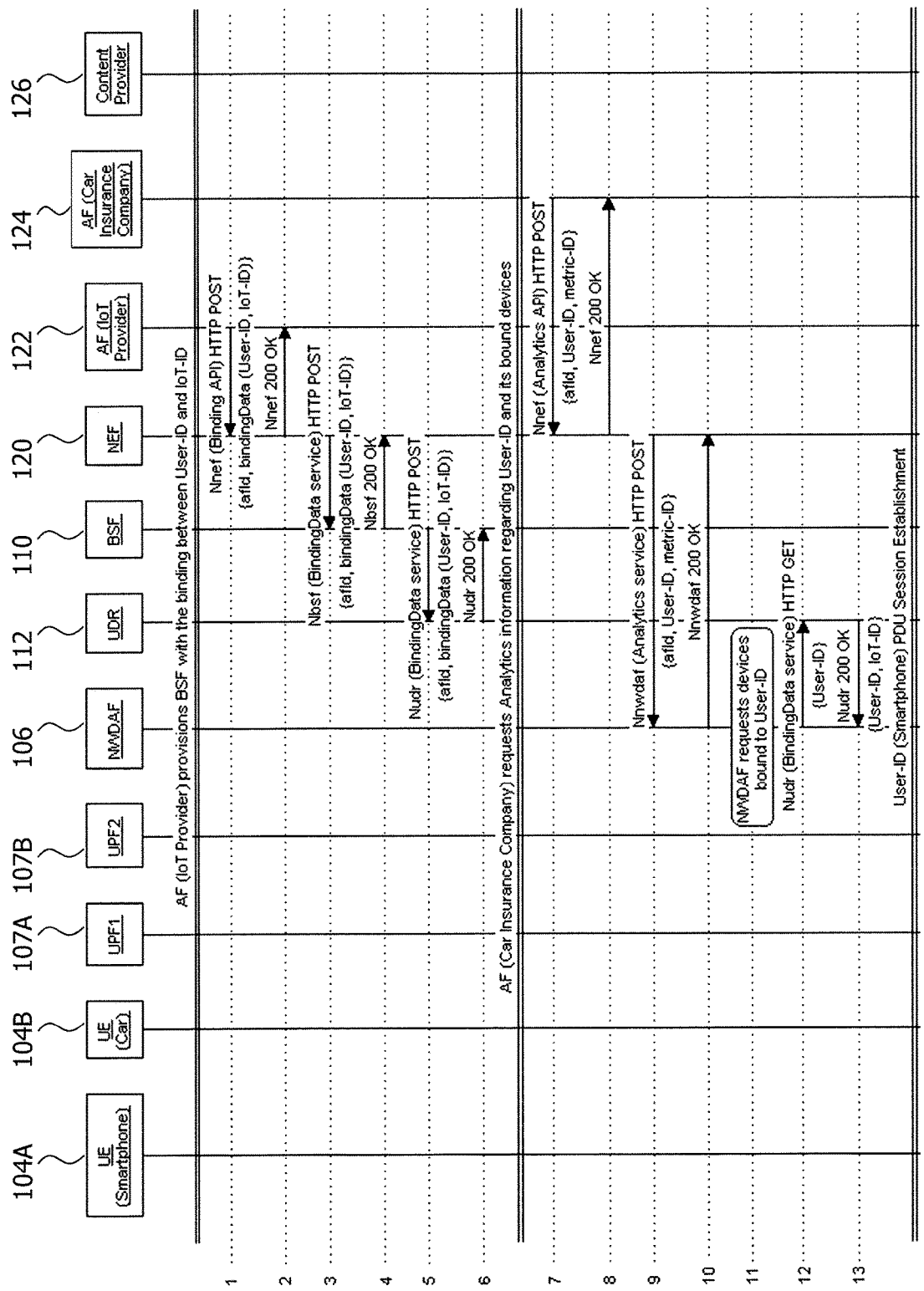
FIGS. 6A-C are schematic diagram signaling diagrams illustrating further embodiments of the present disclosure.

Providing BFS 110 with Information on Grouped Terminal Devices/Subscriptions At the moment the car is bought by the user, the car manufacturer/IoT provider operating AF 122 provisions BSF 110 with the information that will allow a binding, or grouping, between the user mobile subscription identity (User-ID=Smartphone SUPI) and the IoT device subscription identity (IoT-ID=Car SUPI), see step 1 in FIG. 6A. As explained above, there are different alternatives to provision this information. It is proposed to utilize a new application programming interface (API) for "binding data", so the AF 122 triggers a Nnef HTTP POST message towards NEF 120 including and (e.g., Toyota Inc) and bindingData (including the User-ID and IoT-ID). It could be possible that the IoT provider is not aware of the mobile subscription (User-ID). In that case, IoT provider will send the IoT-ID and, instead of the User-ID, a global identifier for the user (e.g., user's e-mail address or the user's identity card number) that permits grouping the IoT-ID with a User-ID associated with the same global identifier.

In steps 2 and 3 of FIG. 6A, NEF 120 answers AF 122 with a successful response (Nnef 200 OK) and triggers a Nbsf HTTP POST message including the same information as in step 1 (afId and bindingData) towards BSF 110. It is proposed that BSF 110 supports a new service (Binding Data service) for this procedure.

In steps 4 to 6, BSF 110 answers NEF 120 with a successful response (Nbsf 200 OK) and triggers a Nudr HTTP POST message including the same information as conveyed in steps 1 and 3 (afId and bindingData) towards UDR 112. As a result, the grouping of User-ID and IoT-ID will be stored by BSF 110 in database of UDR 112. UDR 112 answers BSF 110 with a successful response (Nudr 200 OK). It is proposed that also UDR 112 supports a new service (Binding Data service) for this procedure.

AF Request for NDA Information Based on Grouped Devices/Subscriptions

In steps 7 of FIG. 6A, AF 124 (e.g., Direct Car Line Insurance Company) requests correlated NDA information for a certain user and its bound devices. It is proposed to introduce a new API (for NDA information) for this purpose, so the AF 124 triggers a Nnef HTTP POST message including the afId (Direct Car Line Insurance Inc), the user identity (User-ID) and the metric-ID (which identifies the NDA information to be requested, in this use case it relates to usage of a certain app like Whatsapp while driving the car. The AF request could be either of type subscribe/notify (the one assumed in this example) or request/response.

In steps 8 and 9 of FIG. 6A, NEF 120 answers AF 124 with a successful response (Nnef 200 OK) and triggers a Nnwdaf HTTP POST message including the same fields as in step 7 above (afId, end user identity and metric-ID) towards NWDAF 106.

NWDAF 106 Request to BSF 110 on Grouped Devices/Subscriptions

In steps 10 to 13 of FIG. 6A, NWDAF 106 answers NEF 120 with a successful response (Nnwdaf 200 OK) and requests the devices bound to User-ID by triggering a Nudr HTTP GET message including the user identity (User-ID) as a group identifier toward UDR 112. UDR 112 answers NWDAF 106 with a Nudr 200 OK including the grouped device/subscription identities (User-ID and IoT-ID). In an alternative variant, BSF 110 could serve as a proxy between NWDAF 106 and UDR 112.

At this point, NWDAF 106 will check if there is an active PDU session for User-ID and an active PDU session for IoT-ID. In the example illustrated in FIGS. 6A to 6C, both PDU sessions have not yet been established, so NWDAF 106 will subscribe to notifications regarding PDU session establishment (or modification) for the terminal identifiers "User-ID" and "IoT-ID" at suitable target NFs such as the UPFs 107A, 107B and 107C illustrated in FIG. 1 (not shown in FIGS. 6A to 6C). To this end, session notification request including these terminal identifiers are sent from the NWDAF 106 to the UPFs 107A, 107B and 107C.

PDU Session Establishment for the First Bound Device/Subscription (Configuration of UPF 107A)

Figure 6B:
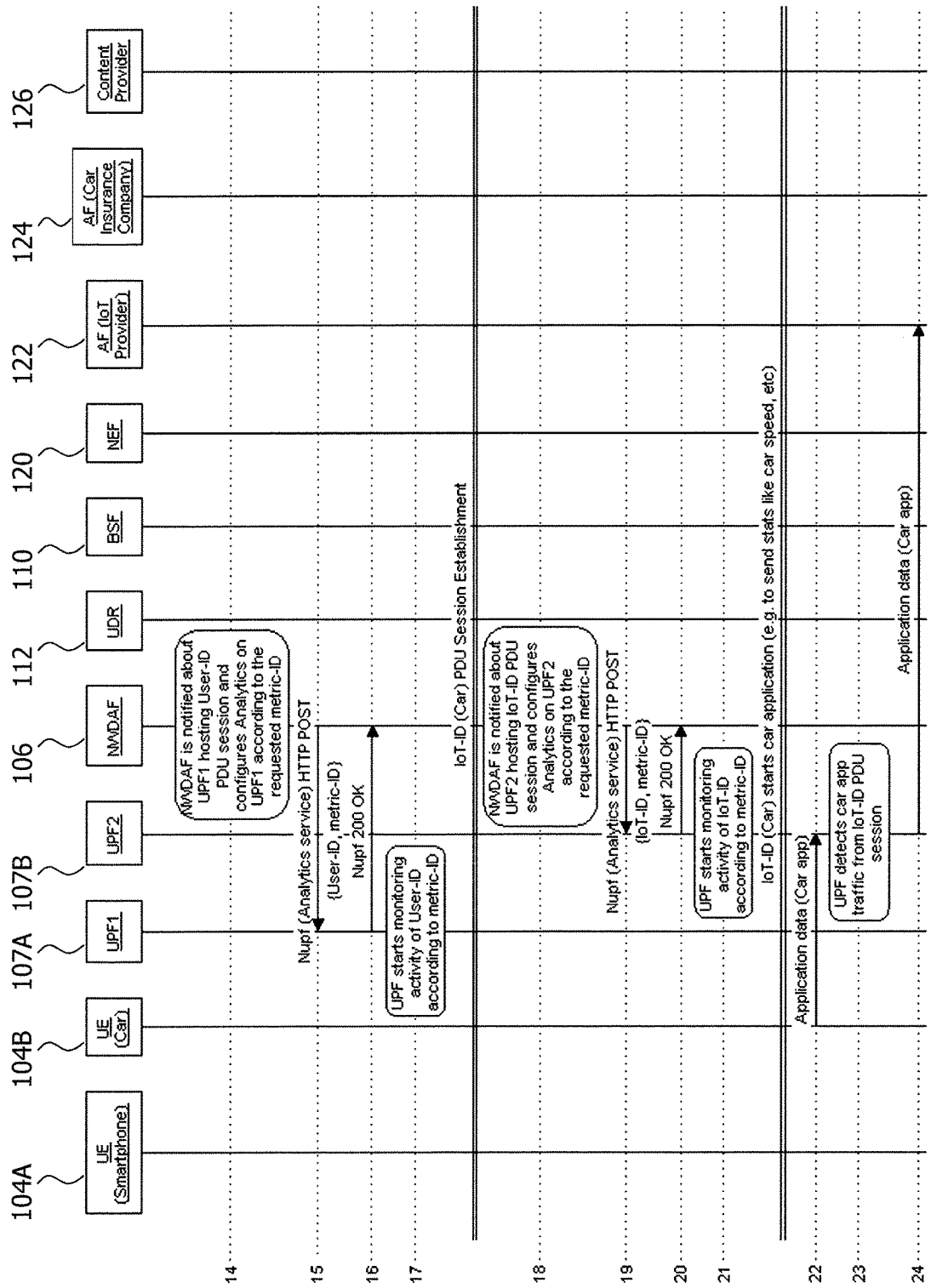

In steps 14 and 15 of FIG. 6B, terminal device 104A associated with group member identifier "User-ID" registers in the core network domain and triggers PDU session establishment (the signaling messages are not illustrated in FIG. 6B). As a result of this, UPF 107A is selected to carry traffic for this PDU session. As mentioned above, NWDAF 106 has previously subscribed to notifications regarding PDU session establishment (or modification) for the terminal device 104A associated with group member identifier "User-ID". In this case, NWDAF 106 will get notified by a session notification from UPF 107A that UPD 107A is handling the user plane traffic for the PDU session associated with group member identifier "User-ID". As a consequence, NWDAF 107 will configure UPF 107A to report NDA information according to the requested metric identifier (as previously received by NWDAF 106 in step 9). This is done by NWDAF 106 triggering a Nupf HTTP POST message to UPF 107A including at least the parameters "User-ID" and "metric-ID" (i.e., at least one group member identifier and the NDA specification). It is proposed that UPF 107A supports an NDA service and an SBA interface for this purpose (this could alternatively be done through SMF).

In case there is a PDU session modification resulting in UPF relocation (e.g., from UPF 107A to UPF 107C) in the PDU session for group member identifier "User-ID", NWDAF 106 should be notified accordingly in a change notification, in order to configure UPF 107C accordingly (and stop NDA information processing for group member identifier "User-ID" at UPF 107A).

A change notification can be sent by any of the UPFs 107A, 107B, 107C to the NWDAF 106 in response to a change notification request of the NWDAF 106. The change notification request may include the group identifier of the device group for which change notifications are to be received. In this way, the NWDAF 106 may subscribe to change notifications.

In steps 16 and 17 of FIG. 6B, UPF 107A answers NWDAF 106 with a successful response (Nupf 200 OK) and UPF 107A starts monitoring activity of User-ID according to metric-ID. In this use case, UPF 107A will monitor (and report) Whatsapp activity.

PDU Session Establishment for the Second Bound Device/Subscription (Configuration of UPF 107B)

In steps 18 and 19 of FIG. 6B, the user's car (with group member identifier "IoT-ID") registers in the core network domain 102 and triggers PDU session establishment (the signaling messages are not illustrated in FIG. 6B). As a result of this registration, UPF 107B is selected to carry traffic for this PDU session.

As mentioned above, NWDAF 106 has previously subscribed to notifications regarding PDU session establishment (or modification) for group member identifier "IoT-ID" at all UPFs. Therefore, NWDAF 106 will get notified by a session notification from UPF 107B that UPD 107B is handling the user plane traffic for the PDU session associated with group member identifier "IoT-ID". As a consequence, NWDAF 106 will configure UPF 107B to report NDA information according to the requested metric-ID (as received by NWDAF 106 in step 9). This is done by NWDAF triggering a Nupf HTTP POST message to UPF 107B including the parameters "IoT-ID" and "metric-ID".

As explained above, it is proposed that UPF 107B supports an NDA service and an SBA interface for this purpose (this could be done through SMF). Moreover, if there is a PDU session modification resulting in UPF relocation appropriate steps measures have to be taken.

In steps 20 and 21 of FIG. 6B, UPF 107B answers NWDAF 106 with a successful response (Nupf 200 OK) and UPF 107B starts monitoring data traffic for the PDU session associated with terminal identifier "IoT-ID" according to the NDA specification defined by the parameter "metric-ID". In the present use case, UPF 107B will monitor car app activity.

Activity Start on PDU Session for the Second Bound Device/Subscription (NDA Reporting from UPF 107B)

Figure 6C:
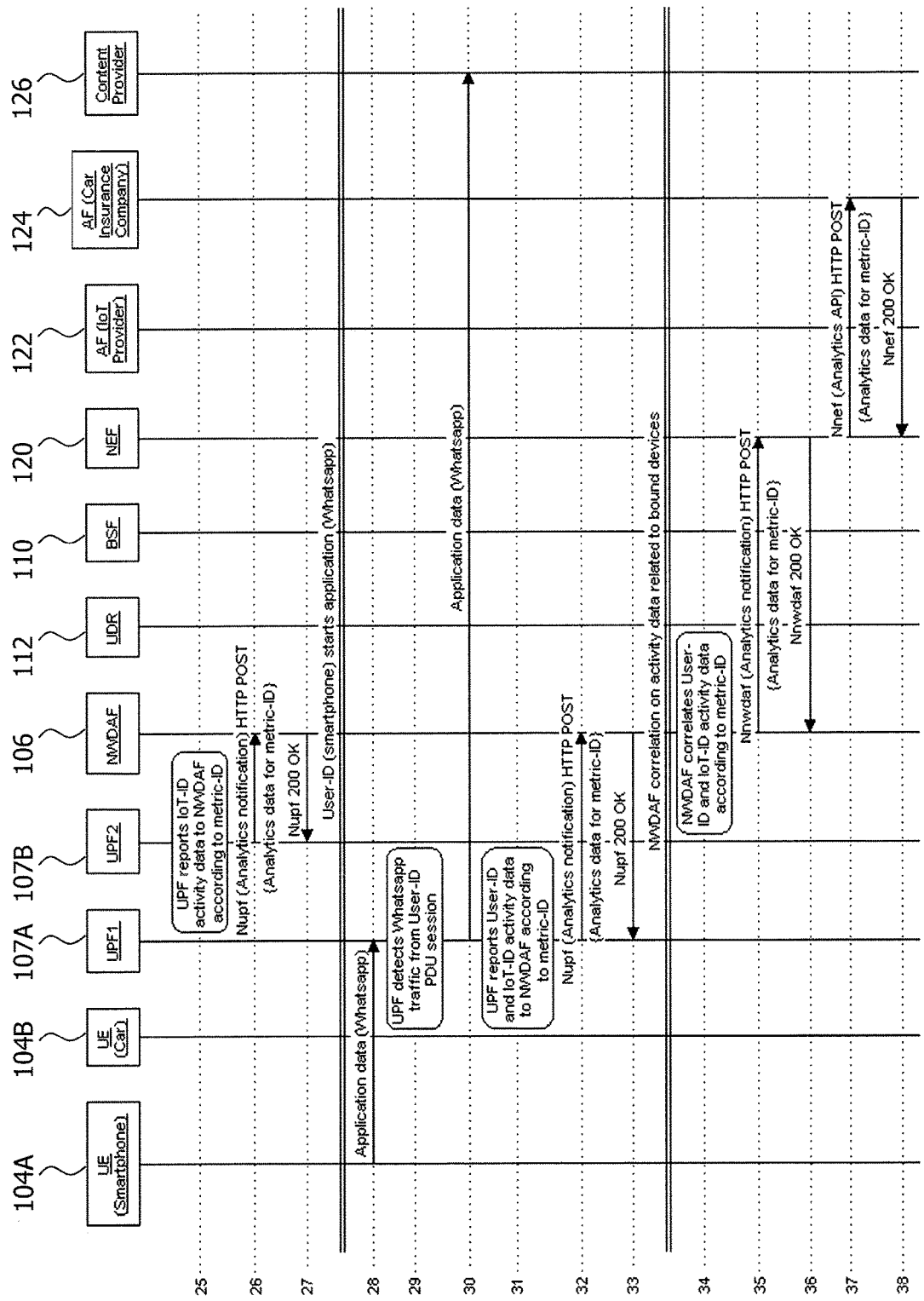

In step 22 of FIG. 6C, terminal device 104B (i.e., car with IoT-ID) starts car application (e.g., to send statistics like car speed, positioning along time, etc). Then, in steps 23 and 24, UPF 107B detects car app traffic from the PDU session associated with group member identifier "IoT-ID". Data traffic generated by the car application is forwarded to the destination (AF 122 operated by IoT provider 114). There may be a mechanism to detect that it is actually the target end user who is driving the car.

In steps 25 to 27 of FIG. 6C, UPF 107B reports activity data for terminal identifier "IoT-ID" (in this case, detection of car application data) to NWDAF 106 according to the NDA specification defined by the parameter "metric-ID" (the activity data may be obtained by DPI or otherwise). To this end, it triggers a Nupf HTTP POST notification message towards NWDAF 106 including analytics data for that NDA specification. NWDAF 106 answers UPF 107B with a successful response (Nupf 200 OK).

Activity Start on PDU Session for the First Bound Device/Subscription (NDA Reporting from UPF 107A)

In step 28 of FIG. 6C, the user associated with the group member identifier "User-ID" starts a smartphone application (e.g., Whatsapp). In steps 29 and 30 of FIG. 6C, UPF 107A detects Whatsapp traffic from the PDU session associated with group member identifier "User-ID". Whatsapp traffic is forwarded to its destination (content provider 126).

In case the parameter "metric-ID" refers to "active" use of Whatsapp application by the user (i.e., the user is not just reading messages but also writing/sending them), UPF 107A should be able to detect that (e.g., by DPI, by heuristics mechanisms or simply by detecting uplink traffic for Whatsapp). Additionally, there could be a mechanism to detect that it is the target end user who id using the smartphone and not a passenger in the car.

In steps 31 to 33 of FIG. 6C, UPF 107A reports activity data for group member identifier "User-ID" (in this case, Whatsapp traffic) to NWDAF 106 according to the parameter "metric-ID". To this end, it triggers a Nupf HTTP POST notification message towards NWDAF 106 including the NDA information gathered for the requested parameter "metric-ID". NWDAF 106 answers UPF 107A with a successful response (Nupf 200 OK).

NWDAF Correlation of NDA Information Related to Bound Devices/Subscriptions and Reporting to AF In steps 34 to 36 of FIG. 6C, once the NWDAF 106 has obtained the NDA information on activity data related to the bound devices/subscriptions, NWDAF 106 correlates activity data for "User-ID" and "IoT-ID" according to metric-ID and triggers a Nnwdaf HTTP POST notification message towards NEF 120 including the correlated NDA information for the requested parameter "metric-ID". NEF 120 answers NWDAF with a successful response (Nnwdaf 200 OK). The correlated NDA information may in the present use case be indicative of the fact that the user (driver) has written Whatsapp messages while driving.

Finally, in steps 37 and 38 of FIG. 6C, NEF 120 triggers a Nnef HTTP POST notification message towards AF 124

(Direct Car Line Insurance Company) including the correlated NDA information for the requested NDA specification as indicated by the parameter "metric-ID". AF 124 answers NEF 120 with a successful response (Nnef 200 OK).

As has become apparent from the above, a solution for grouping devices and/or subscriptions (e.g., when owned by the same user or user group) in a 5G core network domain. In some variants, the current BSF/UDM functionalities are extended as follows:

- an NF (e.g., a portal 116, an IoT provider 114 or any other NF) sends a HTTP POST message to BSF 110 and/or UDM 108 to store a grouping, or binding, between different devices and/or subscriptions subscriptions (e.g., User-ID/User-group-ID and IoT-ID bound to the same user).
- Any NF (e.g., NWDAF 106 or a dedicated core network entity) queries BSF 110 and/or UDM 108 for the bound devices/subscriptions by passing one identifier (e.g., User-ID/User-group-ID), and BSF 110 and/or UDM 108 returns the list of bound IoT devices/subscriptions (e.g., IoT-ID).
- Any NF (e.g. NWDAF 106 or a dedicated core network entity) can subscribe to for notifications upon bound devices/subscriptions updates by passing a list of group member identifiers (e.g., User-ID/User-group-ID/IoT-ID). The NF is then notified when there is a device registration or deregistration for any of the listed group member identifiers.

The proposed solution allows MNOs to support advanced analytics use cases, specifically the ones related to device/subscription binding. Supporting these use cases will allow MNOs to provide better services to third parties/OTTs. All the device/subscription grouping information may be centralized at the BSF 110 and/or UDM 108 and/or the UDR 112, which allows NWDAF 106 or other NF to access it in a simple way. BSF 110, UDM 108 and UDR 112 are functions already defined by 3GPP, so the proposed solution may be implemented as an extension of existing functions It will be appreciated that the present disclosure has been described with reference to exemplary embodiments that may be varied in many aspects. As such, the present invention is only limited by the claims that follow.

The invention claimed is:

1. An apparatus for correlating network data analytics (NDA) information for a device group comprising multiple terminal devices, wherein each terminal device is associated with a group member identifier and the device group is associated with a group identifier, the apparatus being configured as a Network Data Analytics Function (NWDAF) and comprising:
   processing circuitry;
   memory containing instructions executable by the processing circuitry whereby the apparatus is operative to:
   receive, from a network exposure function (NEF), an NDA request comprising a group identifier and an NDA specification of NDA information to be collected;
   send, to at least one of a Unified Data Management (UDM), a Binding Support Function (BSF), and a Unified Data Repository (UDR), a group member identifier request comprising the group identifier;
   receive, from the at least one of the UDM, the BSF, and the UDR and in response to the group member identifier request, one or more group member identifiers associated with the group identifier;
   configure one or more User Plane Functions (UPFs) associated with the group member identifiers in accordance with the NDA specification;
   obtain, from the one or more UPFs, NDA information collected for the group member identifiers based on the NDA specification; and
   correlate the NDA information collected for the group member identifiers based on their association with the device group.

2. The apparatus of claim 1, wherein the instructions are such that the apparatus is operative to:
   receive, from a particular UPF, a session notification comprising a group member identifier associated with a session handled by the particular UPF; and
   determine that the group member identifier comprised in the session notification is one of the one or more group member identifiers received in response to the group member identifier request, and wherein the particular UPF is configured in response to the determination.

3. The apparatus of claim 2, wherein the instructions are such that the apparatus is operative to send a session notification request to one or more UPFs to trigger the one or more UPFs to send session notifications to the apparatus.

4. The apparatus of claim 3, wherein the session notification request includes at least one of the one or more group member identifiers received in response to the group member identifier request.

5. The apparatus of claim 1, wherein configuring a particular UPF comprises sending the NDA specification to the particular UPF.

6. The apparatus of claim 5, wherein the NDA specification is sent together with at least one of the one or more group member identifiers received in response to the group member identifier request.

7. The apparatus of claim 1,
   wherein the NDA information pertains to user data traffic associated with a particular group member identifier.

8. The apparatus of claim 1, wherein the instructions are such that the apparatus is operative to correlate the NDA information by aggregating the NDA information collected for multiple group member identifiers associated with the same group identifier.

9. The apparatus of claim 1, wherein the instructions are such that the apparatus is operative to return the correlated NDA information to an Over-The-Top (OTT) entity as a response to the NDA request.

10. The apparatus of claim 1, wherein the group identifier is one of a subscription identifier and a user identifier binding the multiple terminal devices into the device group.

11. The apparatus of claim 1:
    wherein each group member identifier is associated with only a single device group; and
    wherein the group identifier is a group member identifier.

12. The apparatus of claim 1, wherein the NEF is an interface between the apparatus and an application function (AF) external to a network domain in which the apparatus is located.

13. The apparatus of claim 1, wherein:
    the BSF is configured to store or have access to one or more of user identity information, group member identifiers, data network name, and data network information;
    the UDM is configured to support one or more of subscription management, user identification handling, and registration management of UPFs that serve terminal devices; and
    the UDR is configured to store subscription data.

14. The apparatus of claim 1, wherein the instructions are such that the apparatus is operative to receive a change notification that the device group associated with the group identifier has changed in that a further terminal device having an associated further group member identifier was added to the device group and/or in that one of the terminal devices was removed from the device group.

15. The apparatus of claim 14, wherein the instructions are such that the apparatus is operative to configure a UPF associated with the further group member identifier in accordance with the NDA information specification and/or notify the UPF associated with the group member identifier of the terminal device that was removed from the device group of the removal.

16. The apparatus of claim 14, wherein the instructions are such that the apparatus is operative to send, to the one or more UPFs, a change notification request to trigger sending of change notification to the apparatus.

17. The apparatus of claim 1, wherein at least a first one of the terminal devices is associated with a user identifier as group member identifier and at least a second of the terminal devices is associated with an Internet-of-Things (IoT) identifier as group member identifier.

18. An apparatus adapted to facilitate correlation of network data analytics (NDA) information, the apparatus being configured as at least one of a Unified Data Management (UDM), a Binding Support Function (BSF), and a Unified Data Repository (UDR) and comprising:
processing circuitry; and
memory containing instructions executable by the processing circuitry whereby the apparatus is operative to:
maintain information pertaining to a device group comprising multiple terminal devices, wherein each terminal device has a group member identifier and the device group is associated with a group identifier;
receive, from a Network Data Analytics Function (NWDAF), an identifier request for the group member identifiers of the terminal devices in the device group for which the NDA information is to be collected, the identifier request comprising the group identifier; and
return, to the NWDAF in response to the identifier request, one or more of the group member identifiers associated with the group identifier.

19. The apparatus of claim 18, wherein:
the BSF is configured to store or have access to one or more of user identity information, group member identifiers, data network name, and data network information;
the UDM is configured to support one or more of subscription management, user identification handling, and registration management of UPFs that serve terminal devices; and
the UDR is configured to store subscription data.

20. A method for correlating network data analytics (NDA) information for a device group comprising multiple terminal devices, wherein each terminal device is associated with a group member identifier and the device group is associated with a group identifier, the method performed by a Network Data Analytics Function (NWDAF) and comprising:
receiving, from a Network Exposure Function (NEF), an NDA request comprising a group identifier and an NDA specification of NDA information to be collected;
sending, to at least one of a Unified Data Management (UDM), a Binding Support Function (BSF), and a Unified Data Repository (UDR), a group member identifier request comprising the group identifier;
receiving, from the at least one of the UDM, the BSF, and the UDR and in response to the group member identifier request, one or more group member identifiers associated with the group identifier;
configuring one or more User Plane Functions (UPFs) associated with the group member identifiers in accordance with the NDA specification;
obtaining, from the one or more UPFs, NDA information collected for the group member identifiers based on the NDA specification; and
correlating the NDA information collected for the group member identifiers based on their association with the device group.

* * * * *